Figure 1:
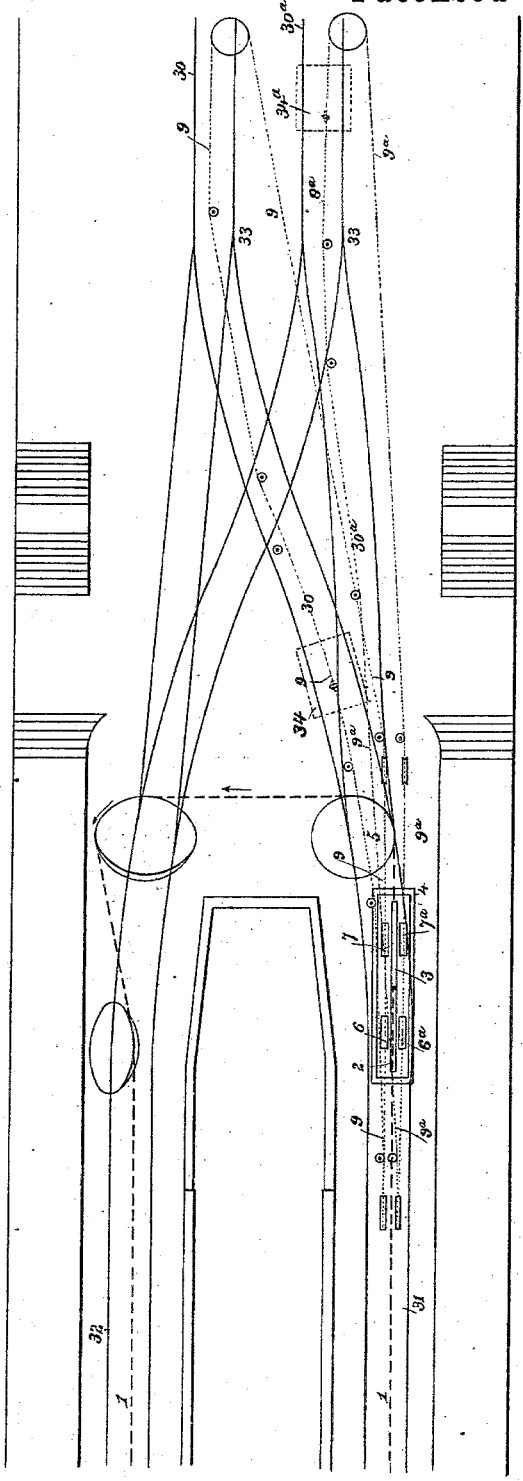

(No Model.) 5 Sheets—Sheet 3.

W. H. PAINE.
AUXILIARY SWITCHING APPARATUS FOR CABLE RAILWAYS.

No. 296,603. Patented Apr. 8, 1884.

Witnesses:
J. Henry Kriser
Geo. T. Smallwood

Inventor:
William H. Paine.
by Knight Bros
Att'ys (No Model.)　　　　　　　　　　　　　　　　5 Sheets—Sheet 4.

W. H. PAINE.
AUXILIARY SWITCHING APPARATUS FOR CABLE RAILWAYS.

No. 296,603.　　　　　　　　Patented Apr. 8, 1884.

Witnesses:
J. Henry Kaiser.
Geo. T. Smallwood.

Inventor
William H. Paine,
by Knight Bros.
Atty⁸

(No Model.) 5 Sheets—Sheet 5.
W. H. PAINE.
AUXILIARY SWITCHING APPARATUS FOR CABLE RAILWAYS.
No. 296,603. Patented Apr. 8, 1884.
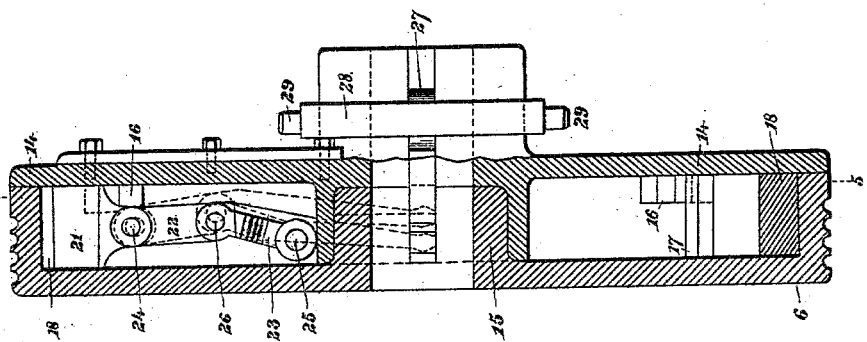
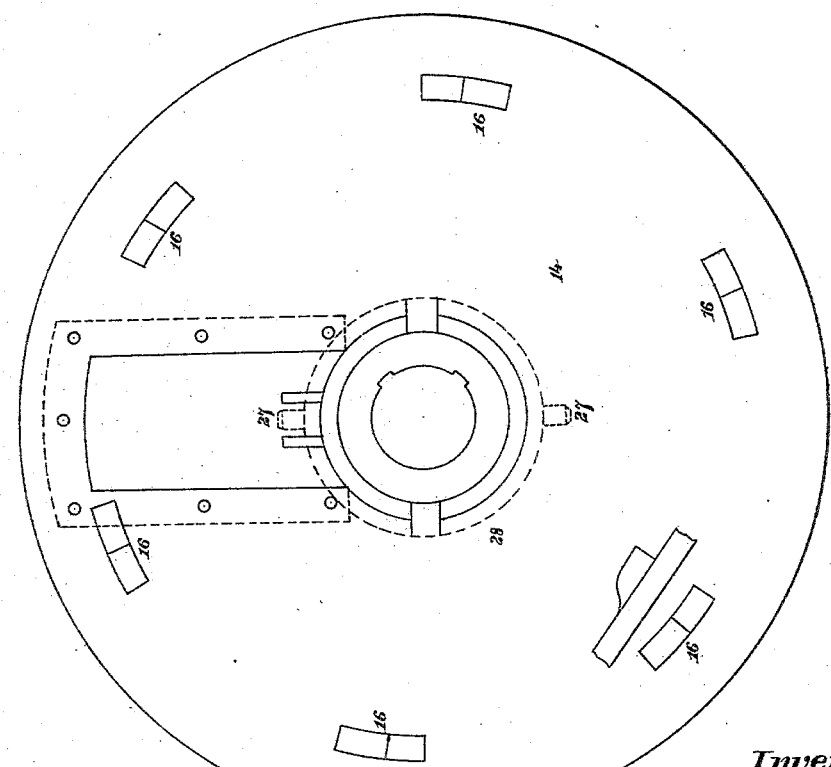
Witnesses:
J. Henry Kaiser.
Geo. T. Smallwood.
Inventor:
William H. Paine.
by Knight Bros.
Attys

UNITED STATES PATENT OFFICE.

WILLIAM H. PAINE, OF BROOKLYN, NEW YORK.

AUXILIARY SWITCHING APPARATUS FOR CABLE RAILWAYS.

SPECIFICATION forming part of Letters Patent No. 296,603, dated April 8, 1884.

Application filed August 31, 1883. (No model.)

*To all whom it may concern:*

Be it known that I, WILLIAM HENRY PAINE, a citizen of the United States, residing at Brooklyn, in the State of New York, have invented certain new and useful Improvements in Cable Railways, of which the following is a specification.

My invention relates to means for switching or shunting a car from one track to another of a cable railway. To this end I pass the main driving-rope over one and under the other of two sheaves placed near together, so as to rotate the said sheaves in opposite directions; and I employ clutch-drums running loosely on the shafts of the said sheaves, and adapted to be connected with either one or the other, at the will of the operator. Around the clutch-drums an auxiliary endless rope is passed a sufficient number of times to give it required traction. It will now appear that as the sheaves are rotated in opposite directions by the main rope passing between them and over one and under the other, if one of the clutch-drums be connected with the corresponding sheave the auxiliary rope will be driven in one direction while the other drum runs loosely on the shaft of its sheave; whereas if the second drum be clutched with its sheave while the first is allowed to run loose, the auxiliary rope will be driven in the opposite direction. The auxiliary rope is carried over suitable guiding-sheaves, and the whole apparatus is located in such relation to the main rope that a car carried by the main rope may be disconnected therefrom and connected with a dummy carried by the auxiliary rope, and taken thereby to the end of the track, and by a reversed movement of the auxiliary rope run back to a switch, by which it will be carried over to the other track for the return trip. The reversal of the rope may be effected by the movement of a single lever connected with the levers of the respective clutch-drums, so as to release one and connect the other with the respective main-sheaves at one operation. I preferably employ an inclined track in connection with the switch, the car being run up the incline in its forward movement, and started down the incline by the reversed movement, after which it may be disconnected from the auxiliary rope, and the completion of its movement to the other track effected by gravity. In practice I employ two pairs of these clutch-drums and two auxiliary ropes, guided, respectively, over divergent switching or shunting tracks, and upon each of these divergent tracks I use a dummy-car connected constantly with the auxiliary rope, so that the cars arriving successively over the main track may be taken by the dummy-cars up the divergent auxiliary tracks alternately, from which they are, by means of switches, as before explained, successively returned to the main track on the other side of the road for the return trip. The use of two auxiliary switching-tracks for the alternate reception of the incoming cars affords the necessary time for shunting the cars to the opposite track without delay. Automatic switches are employed, with a suitable construction of flanges on the wheels of the main cars and dummy-cars, respectively, by which the main cars are automatically shunted from the switching-tracks to the main return-track, while the dummy-cars pass through the switches and remain on their respective auxiliary tracks.

Figure 2:
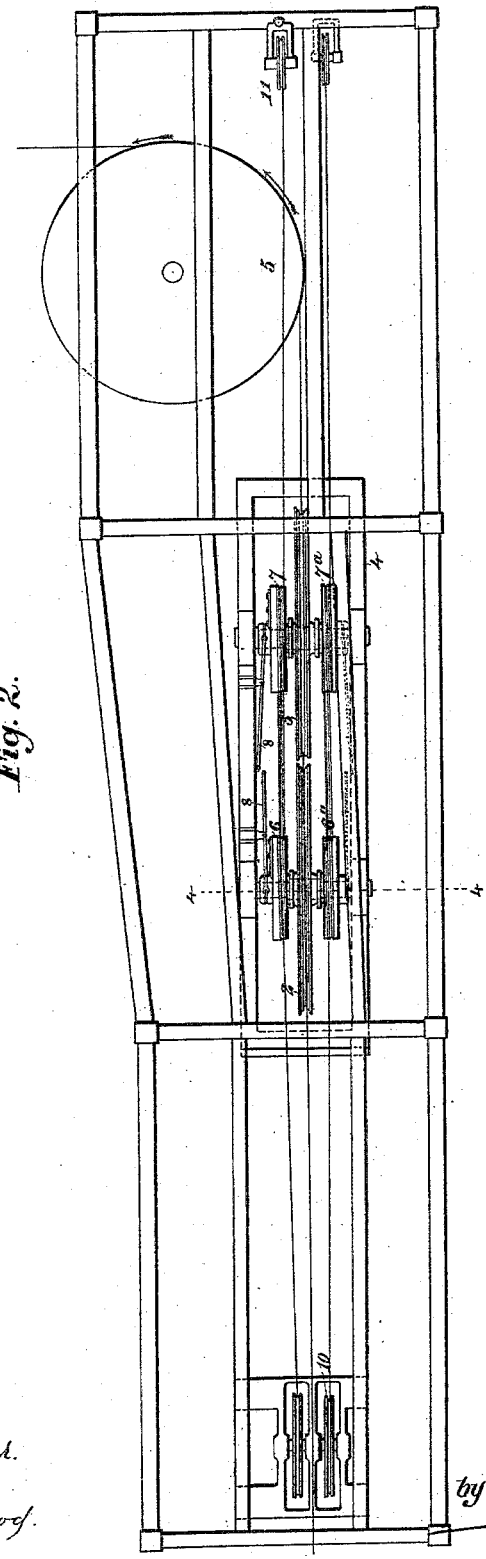
Figure 3:
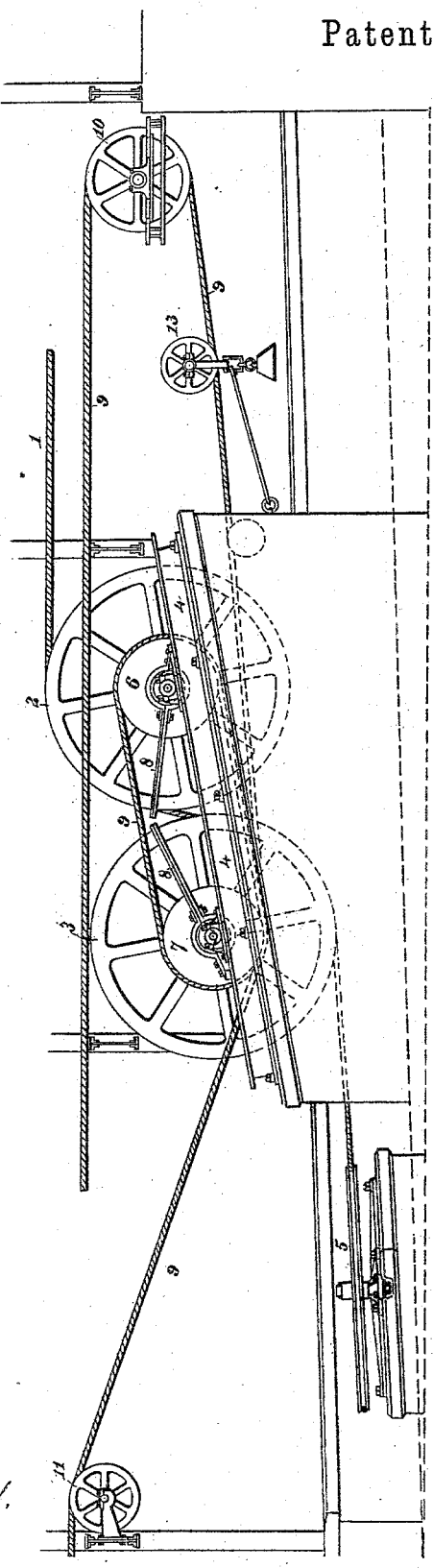
Figure 4:
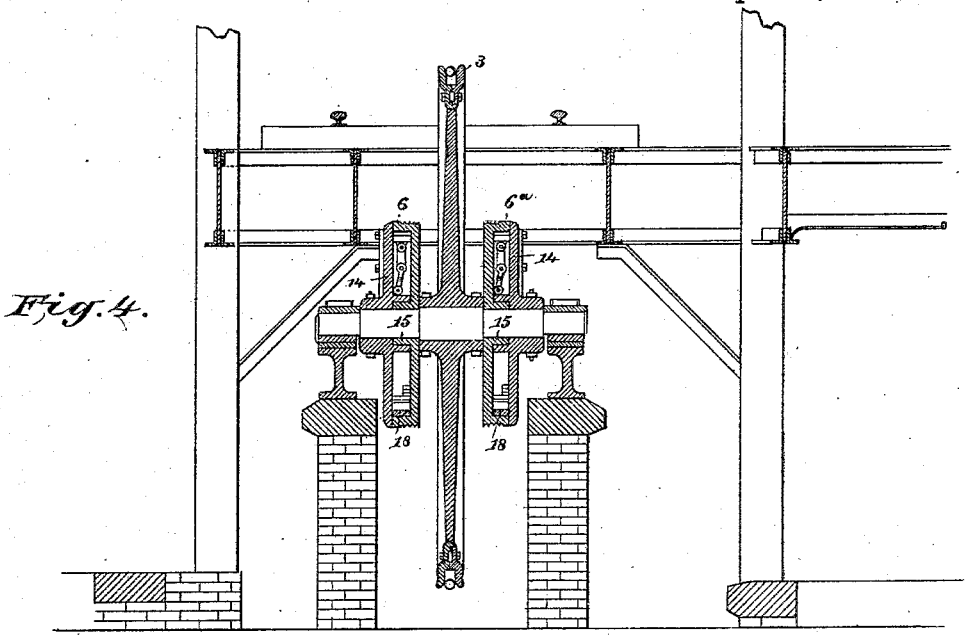
Figure 5:
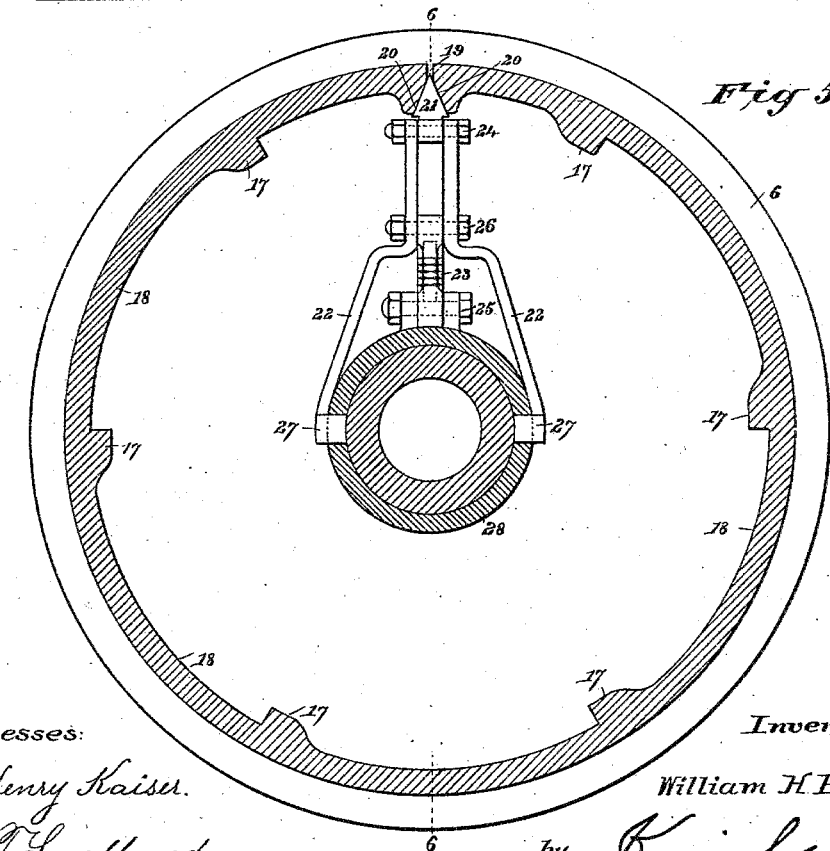

In the accompanying drawings, Figure 1 is a plan view of the tracks, &c. Fig. 2 is a plan view of the auxiliary rope-driving apparatus on a larger scale. Fig. 3 is a side elevation of the same. Fig. 4 is a cross-section on a still larger scale, through the guiding-sheave and drums on line 4 4, Fig. 2. Fig. 5 is a transverse section of one of the clutch-drums, on a still larger scale, on the line 5 5, Fig. 6. Fig. 6 is a longitudinal section on the line 6 6, Fig. 5. Fig. 7 is a face view of the clutch.

1 represents the main rope of a cable railway.

2 3 are sheaves mounted near together in a common frame, 4. The main rope passes, as shown, over the first sheave 2, down between this and the second sheave 3, under the sheave 3, and then around a horizontal return-sheave, 5, from which it may be carried to the other track, as illustrated in Fig. 1. 6 7 are clutch-drums mounted loosely on the shafts of the respective sheaves 2 and 3, and by suitable levers, 8, connected with said shafts at will. The peripheries of the clutch-drums are formed with a number of grooves for the reception of the endless auxiliary rope 9, which is passed a number of times around the two clutch-drums, as illustrated in Figs. 2 and 3, so as to afford the necessary traction to cause the ropes to be driven by the said drums.

10 11 are guiding-sheaves, around which the auxiliary rope is passed to conduct it to the position required.

13, Fig. 3, represents a tightening pulley to keep it taut.

A second pair of clutch-drums is shown at $6^a$ $7^a$, on the opposite sides of the sheaves 2 3, with their own levers 8, for connecting them with the respective sheaves. Clutch connections may be made in any suitable manner. Toothed clutches may be used, or friction-clutches of any common construction, to engage with the faces of the sheaves. The clutch which I employ in practice is represented in Figs. 5, 6, and 7. The clutch-disk 14 is keyed or otherwise secured to the shaft of the sheave 2 or 3, so as to be driven thereby. The drum 6 is provided with a hub, 15, fitted to turn freely within the hub of the clutch-disk 14. The inner face of the disk 14 is provided with clutch-teeth 16, Figs. 6 and 7, adapted to engage with the corresponding teeth 17 on the periphery of the divided clutch-ring 18, Figs. 5 and 6, so as to drive the same, while permitting the expansion and contraction of the said ring 18 for the purpose of clutching and unclutching the clutch-sheave or drum 6. The ring 18 is cut at 19, Fig. 5, to permit its expansion and contraction, its meeting extremities being formed with tapering faces 20, to receive a wedge-shaped radial bolt, 21, which is thrust outward and retracted by a lever, 22, fulcrumed to it at 24, and connected by a bolt, 26, to a thrust-link, 23, which is pivoted at 25, on the hub of the clutch-disk 14.

The lever 22 is made in two parts, as shown in Fig. 5, connected together by the fulcrum-bolts 24 and 26, and engaged at their extremities by slides 27, which are guided longitudinally within the hub of the clutch-disk, and are each formed at one end with a pair of jaws to embrace the end of the lever, and at the other with similar jaws to engage and slide round upon a non-rotating sleeve or ring, 28, which is provided with trunnions 29, for the attachment of the lever 8, by which the said sleeve or ring 28 is moved longitudinally on the shaft to clutch or unclutch the drum. When it is moved in one direction the toggle-link 23, being brought more nearly in line with the lever 22, forces the latter and the wedge-shaped bolt 21 out with great force, so as to expand the ring 18 within the periphery of the drum 6, and impart rotation thereto. When the lever is moved in the other direction the toggle-link 23 is deflected and retracts the wedge-shaped bolt 21, permitting the ring 18 to contract in size and release the drum. In order to adapt the ring 18 to contract spontaneously in this manner when released from bolt 21, it is finished in its expanded state—that is to say, having been cut it is expanded—and while it is in its expanded condition it is turned down to fit the inner periphery of the drum, so that when released it will recede therefrom and leave the drum free, as explained.

The second pair of clutch-drums $6^a$ $7^a$ are provided with an auxiliary rope, $9^a$. The respective auxiliary ropes 9 and $9^a$ are connected with dummy-cars 34 $34^a$, running on divergent switching-tracks 30 $30^a$, both connected with the main track 31, so as to receive the incoming cars, which are taken by the dummies alternately on their own respective switch-tracks. Both the auxiliary tracks 30 $30^a$ are connected through their switches 33 with the opposite main track 32, on which cars depart for the return trip. The switches and the flanges on the wheels of the passenger-cars are, as already stated, so constructed that the passenger-cars descending on either of the auxiliary tracks 30 $30^a$ will be shunted to the departing track 32, while the dummies having extra wheel-flanges or being otherwise suitably constructed in any of the known modes, to prevent their being carried away by the switches, will remain constantly on their respective auxiliary tracks 30 $30^a$.

The direction of movement of the main rope and sheaves is indicated by arrows. In operation, when a car has reached the terminus and been discharged of its passengers it is disconnected from the main rope 1 and connected with one of the dummies 34—for example, attached to the auxiliary rope 9, which, by the connection of the first clutch-drum 6 with the first sheave 2, is driven in the required direction to carry the dummy and car up the inclined track 30 beyond the switch 33. The clutch-drum 6 is then disconnected and clutch-drum 7 connected with the second sheave 3, imparting reversed movement to the rope which starts the car backward through the switch 33, from which it is shunted to the departing track 32. At the same time while the passenger-car referred to has been passing up the track 30 a second passenger-car may in like manner be received by the second dummy $34^a$ and conducted up the second switch-track $30^a$ in readiness to follow the first car through the switch 33 to the track 32 without delay.

The right is reserved to embrace in a future application any original features in the clutch device or other invention incidentally described in connection with the present invention, but not constituting an essential or vital part thereof.

Having thus described my invention, the following is what I claim as new therein and desire to secure by Letters Patent:

1. The combination of a main driving-rope, a pair of sheaves between which said rope is passed, so as to rotate them in opposite directions, an auxiliary rope, and a pair of clutch-drums for driving said auxiliary rope, placed in connection with either of the main driving-sheaves at will for running the auxiliary rope in either direction, substantially as described.

2. A double-track cable railway provided with divergent shunting-tracks, suitable switches connected therewith, and divergent auxiliary or supplemental cables for the said divergent shunting-tracks, whereby incoming cars may be run from one of the main tracks upon divergent shunting-tracks alternately and from them transferred in succession to the opposite main track for the return trip, substantially as described.

3. The combination of a main driving-rope, a pair of auxiliary switching-ropes, and alternately-moving dummies connected with the said switching-ropes, so as to pass the incoming cars alternately to the two switching-tracks, for successive transfer to the opposite track of the main railway, substantially as set forth.

4. The combination, with the main rope of a cable railway, of a pair of drums constantly driven thereby in opposite directions, two pairs of drums driving auxiliary ropes and connected at the will of the operator with either of the main driving-drums, so as to run the respective auxiliary ropes in either direction required, a pair of divergent tracks carrying dummy-cars driven by the respective auxiliary ropes, and suitable switches for transferring the main-line cars from the auxiliary tracks to the return-track of the main road, substantially as set forth.

5. The combination, with the main driving-rope of a cable railway, of a pair of sheaves driven thereby in opposite directions, two pairs of clutch-drums carrying auxiliary shunting-ropes and connected with the constantly-moving driving-sheaves at the will of the operator, for running said auxiliary shunting-ropes in opposite directions, dummy-cars moved by the auxiliary shunting-ropes upon separate tracks, and a switching mechanism operating to transfer the main-line cars from the auxiliary switching-tracks to the main return-track, and retain the dummy-cars on the switching-tracks, as explained.

WILLIAM H. PAINE.

Witnesses:
OCTAVIUS KNIGHT,
GEO. O. SACKETT.